United States Patent
Forster

(10) Patent No.: US 7,622,062 B2
(45) Date of Patent: Nov. 24, 2009

(54) METHOD AND DEVICE FOR PRODUCING THREE-DIMENSIONAL MOLDED PARTS AND CORRESPONDING MOLDED PART

(75) Inventor: Egon Forster, Worth am Rhein (DE)

(73) Assignee: Fiber Engineering, GmbH, Worth am Rhein (DE)

( * ) Notice: Subject to any disclaimer, the term of this patent is extended or adjusted under 35 U.S.C. 154(b) by 535 days.

(21) Appl. No.: 10/558,783

(22) PCT Filed: Apr. 2, 2004

(86) PCT No.: PCT/EP2004/003505

§ 371 (c)(1),
(2), (4) Date: Nov. 29, 2005

(87) PCT Pub. No.: WO2004/106042

PCT Pub. Date: Dec. 9, 2004

(65) Prior Publication Data

US 2007/0007695 A1 Jan. 11, 2007

(30) Foreign Application Priority Data

May 30, 2003 (DE) ................................. 103 24 735

(51) Int. Cl.
*B27N 5/00* (2006.01)
(52) U.S. Cl. .................... 264/113; 264/40.5; 264/121; 264/517; 425/80.1; 425/81.1
(58) Field of Classification Search ................. 264/121; 425/80.1

See application file for complete search history.

(56) References Cited

U.S. PATENT DOCUMENTS

| 5,482,665 | A | * | 1/1996 | Gill ............................. 264/113 |
| 5,569,425 | A | * | 10/1996 | Gill et al. ..................... 264/121 |
| 5,571,465 | A | * | 11/1996 | Gill et al. ..................... 264/121 |
| 5,679,296 | A | * | 10/1997 | Kelman et al. ................. 264/71 |
| 5,942,175 | A |   | 8/1999 | Curran et al. |
| 6,033,501 | A | * | 3/2000 | Yamaguchi et al. ........ 156/62.2 |
| 6,033,607 | A | * | 3/2000 | Kataoka et al. ............ 264/40.3 |
| 6,096,249 | A | * | 8/2000 | Yamaguchi ................. 264/40.3 |
| 2003/0224145 | A1 | * | 12/2003 | Campion et al. ............ 428/171 |

\* cited by examiner

*Primary Examiner*—Mary Lynn F Theisen
(74) *Attorney, Agent, or Firm*—Gardere Wynne Sewell LLP; Marc A. Hubbard

(57) ABSTRACT

A method for producing three-dimensional parts made of fiber material using a mold, comprising a bottom mold, the inner side of which determines the contour of the bottom side of the molded part and a top mold whose inner side determines the contour of the top side of the molded part. The bottom mold and/or the top mold have holes enabling the passage of air. Fibers are blown into the interior of the closed mold with the aid of an air current and are deposited in the inner sides of the bottom mold and the top mold, whereby a blank of fiber material is formed, the fibers bound together by a bonding agent, whereupon the blank is hardened into a molded part. A device for the production of three-dimensional molded parts comprises a mold having at least one inlet hole for blowing in the fiber material. The molded part has areas with different thickness.

14 Claims, 2 Drawing Sheets

METHOD AND DEVICE FOR PRODUCING THREE-DIMENSIONAL MOLDED PARTS AND CORRESPONDING MOLDED PART

BACKGROUND OF THE INVENTION

Three-dimensional molded parts made of fiber material are used, in particular, in the automotive industry. These molded parts are used for sound insulation. They are used, for example, as door linings, rear package shelves, and vehicle ceilings. Likewise, the floor and the walls connecting the passenger compartment to the trunk space and also the passenger compartment to the engine space are lined with sound-insulating molded parts. Here, one-piece parts should be used as much as possible. The car-body plates are deformed greatly and irregularly in terms of stiffness and material savings. They feature receptacles for additional components of the vehicle and passages, for example, for cable channels and the steering-wheel column. The molded parts that are used for sound insulation must be adapted to these strongly three-dimensionally shaped chassis parts.

Three-dimensional molded parts for sound insulation, so-called acoustic parts, with unequal thickness, currently can be produced from PU foam. However, this is relatively expensive, because this type of foam is produced on the basis of crude oil. In addition, PU foam is also hard to recycle. When burned, it emits poisonous vapors.

Molded parts made of conventional fiber mats, which are produced from fiber materials by rollers, are only suitable to a limited degree. Fiber mats can only be used for weakly deformed parts. Under greater deformation, the mats rip. Also, due to the rolling method, they do not exhibit a uniform density distribution. Therefore, they frequently do not correspond to the geometrical and acoustic requirements placed on such special molded parts.

Furthermore, in the state of the art, three-dimensional non-woven parts are known, which consist of a fiber mixture or fibers and an added bonding agent. These nonwoven parts are produced by means of a hot-molding process: a fiber mixture flows from above into a bottom mold, so that the fibers accumulate in the bottom mold. This flocking of the bottom mold is realized by means of a moving pivot channel, which can be moved above the bottom mold. After the bottom mold is filled, a top mold is placed on the bottom mold so that the dry, layered fibers are pressed. Then hot air is passed through the mold consisting of the bottom and top molds so that the fibers fuse to each other, resulting in a molded part. A disadvantage of this method is that partial flocking cannot be performed precisely, and thus, in particular, a local increase in density is not possible. Because the density of the final molded part is defined only by the accumulated fibers in a local region, the density in the molded part can be varied only in the scope of accumulation possible due to the force of gravity. Likewise, it is possible only with difficulty to reduce the weight of the entire molded part, such that certain acoustically non-critical areas feature a smaller density. However, the reduction of the total weight is very important in vehicle construction. Because the flocking of the bottom mold occurs solely according to the laws of gravity, in that, namely, the fibers are simply scattered in the mold, a high cycle time for the production of such a molded part is produced. Due to the expensive machine use times, the costs of the molded part are rather high.

Unexamined German Patent Application No. 23 18 501.5 discloses a device for producing fiber preforms. Chopped fibers are deposited against the inner surface of a horizontally rotating sieve-like mold. The feed is realized by means of a tube, which can move horizontally. The fibers laid in the mold are pressed against the mold by an external vacuum, which surrounds the outer surface of the mold. Then the fibers are coated with a plastic resin bonding agent spray, which hardens under heat. Hot air can pass through the mold filled with fibers so that the formed body hardens.

DE 35 41 073 A1 describes a method and a device for producing a starting material for molding a fiber-reinforced part. Raw fibers, which are saturated with resin, are cut into segments of predetermined length and collected in a container. The container can move so that fibers are deposited according to the molded part to be produced. However, this method has the disadvantages described above.

EP 1 250 991 A1 discloses a production system for automatic production of preforms. The system comprises two cells each with a molded part, a fan for both cells, and an automatic feed unit in order to supply endless fibers to the molds. The supply unit features several sleeves in order to reduce friction and to improve the guidance of the fibers.

The problem to be solved by the present invention is to produce three-dimensional molded parts that feature areas of different thickness and in which the density can be varied locally in a simple and efficient way. In this way, the density variations within the molded part should be exactly reproducible so that even for large quantities identical parts can be produced.

SUMMARY OF THE INVENTION

The present invention provides a method and a device for producing three dimensional formed parts made of fiber material using a mold, comprising a bottom mold, the inner side of which determines the contours of the bottom side of the molded part, and at least one top mold, the inner side of which determines the contours of the top side of the molded part, wherein the bottom mold and/or the top mold have holes for the passage of air. The invention also relates to the molded part itself.

The proposed method for producing three dimensional molded parts made of fiber material under the use of a hollow mold comprising a bottom mold whose inner side defines the contours of the bottom side of the molded part and at least one top mold whose inner side defines the contours of the top side of the molded part, with the bottom mold and/or the top mold having holes for the passage of air, preferably comprises the following steps: fibers are blown into the interior of the closed mold by means of an air current. The fibers are deposited on the inner sides of the bottom mold and the top mold until the mold is filled, whereby a preform made of fiber material is formed. Then the fibers are bonded by means of a bonding agent, whereby the preform is solidified into a molded part. The bonding agent can either be blown in together with the fibers or mixed in for the first time in the course of the method.

The fibers are blown into the interior of the mold consisting of a bottom mold and a top mold by means of an air current. The air, which is the carrier of the fibers, escapes through holes in the bottom mold and/or the top mold. The individual fibers are larger than the holes, so that they are deposited on the inner sides of the mold. The deposition begins at the side in the interior of the mold opposite the blow in opening. In this way a preform is built up from fiber material, which features a constant density.

The fibers can also be blown in simultaneously through several inflow openings. Here, if the blow in pressure differs from the individual inflow openings, areas of different densities are formed in the preform.

If the mold is filled completely with fiber material, a preform is formed which features the contours of the mold. This preform is then solidified into a molded part in that the fibers are bonded to each other by means of a bonding agent. A molded part is produced that corresponds exactly to the contours of the inner sides of the mold. An advantage of the method is that the molded part features a constant density. The density is defined by the pressure of the incoming air current. In this way, first, arbitrary three dimensional shapes can be produced, and, second, a molded part can be reproduced exactly.

In an advantageous configuration of the method according to the invention, the following additional steps are performed: first, fibers are blown into the intermediate space between the bottom mold and a temporary auxiliary top mold by means of an air current. The fibers are deposited on the inner sides of the bottom mold and the temporary auxiliary top mold, whereby a preform made of fiber material is formed. In another step, the temporary auxiliary top mold is removed, and instead, the top mold is placed on the bottom mold, whereby the preform is compacted.

The fibers blown into the intermediate space between the bottom mold and temporary auxiliary top mold are displaced on their inner side and form a preform. The fibers of the preform are pressed together slightly by the blown in pressure so that they are held together loosely. The preform has a stability such that it does not collapse into itself even when the temporary auxiliary top mold is removed, but instead holds its shape. Through suitable dimensioning of the top mold, the preform can then be compacted overall or only in certain areas. In the local areas in which the preform is to feature a higher density, the top mold features a smaller cavity in comparison with the temporary auxiliary top mold. At a later time, the molded part will feature a correspondingly higher density at the compacted areas of the preform. Through this method, the compacted areas within the molded part can be reproduced exactly.

In an advantageous refinement, the method according to the invention comprises the following additional intermediate steps: the fibers are blown into the intermediate space between the bottom mold and a first temporary auxiliary top mold by means of an air current. Fibers are deposited first on the inner side of the bottom mold and this first temporary auxiliary top mold, whereby an intermediate preform made of fiber material is formed. Then the first temporary auxiliary top mold is removed and replaced by a second temporary auxiliary top mold, which is placed on the bottom mold. In the next step, additional fibers are blown into the intermediate space between the bottom mold and the second temporary auxiliary top mold by means of an air current. These fibers are deposited on the top side of the intermediate preform and on the inner side of the second temporary auxiliary top mold, whereby a preform made of fiber material is formed. Then the second temporary auxiliary top mold is removed. At its position, the top mold is placed, which is set on the bottom mold. In this way, the preform is compacted into its final shape.

By means of the previously described method, it is possible to produce molded parts that consist of different layers. Each individual layer can feature different densities. In this way, highly complex molded parts can be produced which feature different density areas. In addition, it is also possible to use different fiber materials for each individual layer.

It is also possible to use more than just two temporary auxiliary top molds. Thus, according to the same principle, nearly arbitrarily layered molded parts can be produced. The method can be further expanded such that the individual layers or a few of the layers are additionally compacted by placing a suitable top mold or auxiliary top mold or a stamp.

In an advantageous configuration of the method, the blow in is then ended when a predetermined value of the air pressure is achieved in the mold. Because the fibers are gradually deposited on the side of the mold opposite the blow in opening, the build-up pressure also rises slowly. When a predetermined pressure is reached, the mold is completely filled. If the blow in is stopped precisely at this time, it is guaranteed that exactly identical molded parts are always generated. Through suitable selection of the predetermined pressure value, the density of the perform, and thus also the density of the molded parts, can be influenced. The higher the predetermined limit value, the greater the density of the resulting preform. The control of the pressure guarantees a constant density of the preform, even when the fibers are blown in more quickly or at a greater pressure, in order to further increase the production time.

Preferably, the preform is heated such that the closed shape is heated and/or hot air passes through the mold. In this way, a permanent connection of the fiber material is generated by a thermal reaction of the binding agent. The preform is solidified into a molded part.

For the use of thermoplastics as a component of the fiber material or for thermally reactive bonding agents, such as, for example, polypropylene fibers, plastic fibers, or phenol resin, the preform must be heated so that the fibers fuse to each other, and a molded part is formed that is dimensionally stable. This can occur such that the closed mold itself is heated. Here, various methods are available. The mold can be heated, for example, in an oven, through irradiation with microwaves or through illumination with heat lamps. Alternatively, it is also possible to heat the preform itself, in that hot air flows through the mold, whose bottom mold and top mold feature holes for the passage of air. This has the advantage that the preform is heated directly. Instead of hot air, hot vapor can also be used. The solidification of the preform into a molded part can be achieved through suitable selection of the fibers or the bonding agent through hardening or through polymerization.

The proposed device for producing three dimensional molded parts made of fiber material comprises a mold formed by a bottom mold, the inner side of which determines the contours of the bottom side of the molded part, and at least one top mold, the inner side of which determines the contours of the top mold of the molded part, wherein the bottom mold and/or the top mold have holes for the passage of air. According to the invention, the mold features at least one inflow opening for blowing in the fiber material. The inflow opening can be arranged at nearly any position of the mold. Thus, the inflow opening can be arranged both on the bottom mold and also on the top mold or at a temporary auxiliary top mold. Several inflow openings can also be provided. This is then especially advantageous when the mold exceeds a certain size and the contours of the mold are very irregular and feature many indentations and bulges. The time necessary for a preform to be formed completely within the mold can be determined by the size of the inflow opening. The surface area of the inflow opening or the total surface area for several inflow openings should not exceed the total surface area of the holes in the top mold and bottom mold. Otherwise, from the beginning a pressure is established in the mold that makes the blow in of fiber material more difficult or impossible.

The inflow opening is connected to a fan by means of a flow channel. The air current, which blows the fibers into the mold, is generated by the fan. The fibers are introduced into the flow channel and led into the mold via this channel through the inflow opening. Thus, the generation of the air current and the supply of the fiber material into the flow channel is independent of the mold that is used. Thus, various molds can be filled with the same blow in installation.

In a preferred embodiment, a pressure sensor for measuring the air pressure is arranged in the interior of the mold. The pressure sensor is preferably placed in the vicinity of the inflow opening. The pressure measured at the pressure sensor is a measure of the degree of deposition of fibers within the mold. The density of the preform can be determined and regulated by means of the measurement of the air pressure.

In a preferred embodiment of the device according to the invention, at least one temporary auxiliary top mold can be set on the bottom mold instead of the top mold. The use of temporary auxiliary top molds has proven to be advantageous when molded parts of different densities or with different layers are to be produced. The temporary auxiliary top mold is set on the bottom mold and filled. It can then be exchanged for the top mold. If the cavity of the auxiliary top mold differs from the volume of the top mold, the preform can still be compacted before it solidifies into a molded part. The compression can also be limited just to local regions. However, the density distribution has very good reproducibility.

Furthermore, a device in which a rotary table with four processing stations is used is advantageous. In one blow in station, fiber material is blown into the mold. A heating station is used for heating the mold. The cooling of the molded part is performed in a cooling station. In a removal station, the mold can be opened and the molded part removed. The use of such a rotary table with at least four stations features the advantage that each station is formed especially for the processing steps to be performed there. The individual stations can be formed such that the production of the molded parts can be optimized. By using a rotary table with several stations, several molded parts can be produced simultaneously, with each molded part being located in a different stage of production. Therefore, the production time of an individual molded part can be significantly reduced.

A molded part, which was produced according to the method according to the invention, distinguishes itself through regions of different density. The various regions are clearly delimited from each other in space. Either various layers or also partial areas of different density can be generated. The areas with higher density can be provided at arbitrary positions of the molded part, independent of the geometry of the molded part. In this way, areas with lower density can also be realized in which the requirements for sound insulation in the molded part play only a subordinate role. The molded part then features a low weight overall.

DETAILED DESCRIPTION OF PREFERRED EMBODIMENTS

Figure 1:
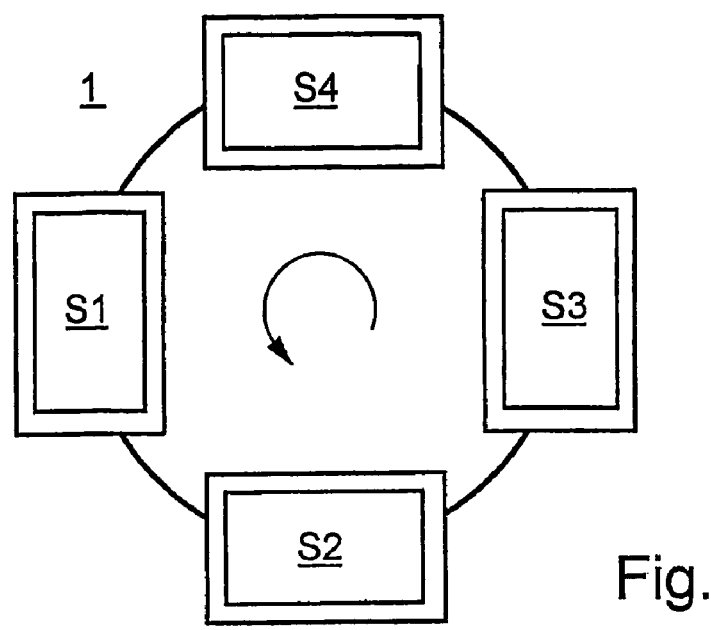
FIG. 1 is a schematic diagram of a device for producing molded parts with four processing stations.

The device shown in FIG. 1 comprises a blow in station S1, a heating station S2, a cooling station S3, and a removal station S4. The stations S1-S4 are arranged on a rotary table 1, which can rotate counterclockwise. In the blow in station S1, fiber material is blown into a closed mold until a preform is formed. In the heating station S2, the production mold is heated so that the preform solidifies into a molded part. In the cooling station S3, the production mold is cooled. In the removal station S4, the mold is opened so that the produced part can be removed.

Figure 2:
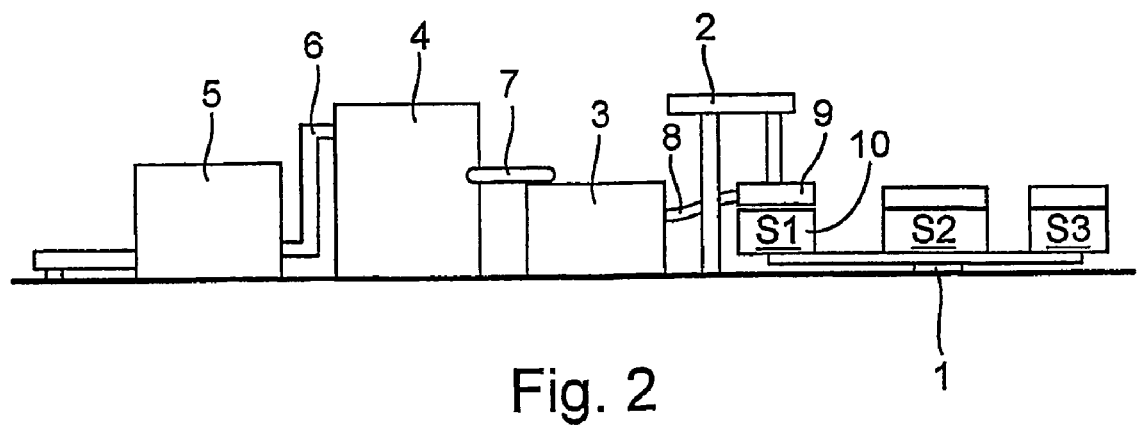
FIG. 2 illustrates a complete system for producing molded parts, schematically.

FIG. 2 shows a complete system for producing molded parts, which comprises the rotary table 1, a supply device 2 for supplying and changing molds, a fan 3, a fiber storage device 4, and a lump opener 5. From rotary table 1, the blow in station S1, the heating station S2, and the cooling station S3 can be seen.

Premixed fiber lumps, which are used as raw material, are fed to the lump opener 5 and there chopped into small fibers. Via a first line 6, the fibers are led into a fiber storage device by means of compressed air. From here, they are fed via another line 7 to the fan 3. Alternatively, the line 7 can also be configured as a transport band. The fibers fall between the fan 3 and an inflow channel 8. The fan 3 generates an air current, by means of which the fibers are blown into a temporary auxiliary top mold 9, which is set on a bottom mold 10, through the inflow channel 8. The temporary auxiliary top mold 9 is set on the bottom mold 10 in the supply device 2.

Figure 3:
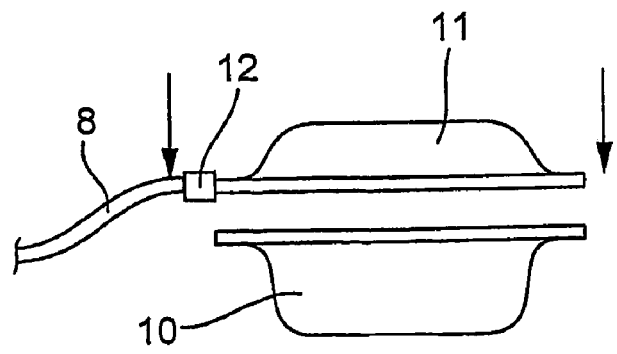
FIG. 3 illustrates a mold for producing molded parts.

FIG. 3 shows the mold for producing a molded part. The mold comprises the bottom mold 10 and a top mold 11 set thereon. The bottom mold 10 and the top mold 11 can be closed. An inflow opening 12, to which the inflow channel 8 is connected, is formed on the top mold 11. The fibers are blown into the closed cavity of the mold through the inflow opening 12.

Figure 4A:
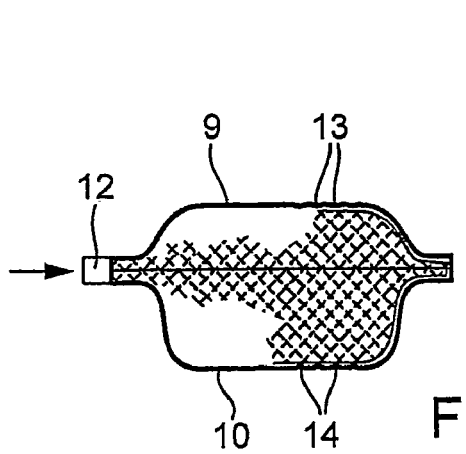
FIGS. 4a-4f illustrate the individual processing steps for producing a molded part.

FIG. 4a shows a closed mold comprising the bottom mold 10 and a temporary auxiliary top mold 9. The bottom mold 10 and the temporary auxiliary top mold 9 are closed tight. The fibers are blown into the closed mold through the inflow opening 12. They are deposited on the inner sides of the bottom mold 10 and the temporary auxiliary top mold 9. The deposition occurs from the side opposite the inflow opening 12. The incoming air escapes through holes 13 in the temporary auxiliary top mold 9 and through holes 14 in the bottom mold 10. Through the deposition of fibers in the interior of the mold, gradually more and more holes 13, 14 are covered since the fibers are larger than the holes 13, 14. The blowing in of fibers is stopped when the closed mold is completely filled with fiber material, and thus a preform is formed. For this purpose, the pressure in the mold is measured by means of one or more pressure sensors. When a predetermined limit value is reached, the blowing in is stopped and interrupted. This occurs abruptly, for example, by opening a bypass valve (not shown) in the inflow channel or by simply turning off the fan.

Figure 4B:
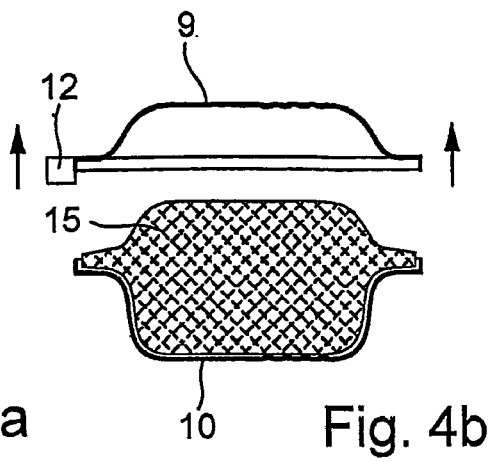

FIG. 4b shows the mold consisting of the bottom mold 10 and temporary auxiliary top mold 9 with a preform 15, which features exactly the contours of the inner sides of the mold. The temporary auxiliary top mold 9 is now detached from the bottom mold 10 and removed upwards.

Figure 4C:
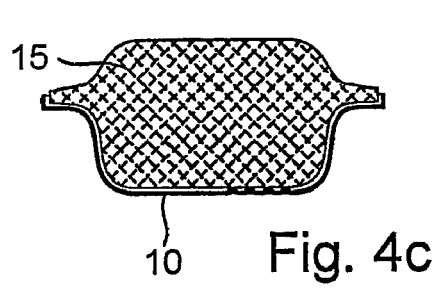

After the temporary auxiliary top mold is removed, the preform 15 is carried exclusively by the bottom mold 10 (FIG. 4c). Through the generated air pressure during the blow in process into the closed mold, the fibers are bonded to each other so strongly that the preform 15 is dimensionally stable. It also maintains its external shape after removal of the temporary auxiliary top mold 9.

Figure 4D:
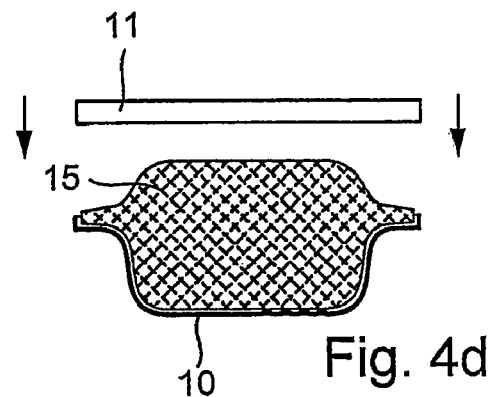
Figure 4E:
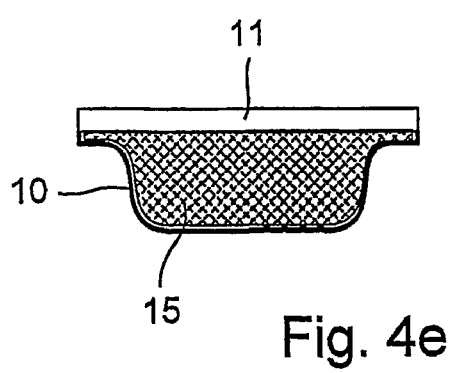

In the next processing step according to FIG. 4d, the top mold 11, which is formed here as a flat plate, is set on the bottom mold 10 from above. The placement of the top mold 11 on the bottom mold 10 occurs with a pressure which is dependent on the size of the parts and on the size of the mold and which can equal up to several tons. Therefore, the preform 15 is compacted, as shown in FIG. 4e. The preform 15 now features the contours of the bottom mold 10 and the top mold 11.

The previously described processing steps are performed in the blow in station S1 on the rotary table (FIG. 1). Then the rotary table 1 is further rotated by a quarter rotation.

Figure 4F:
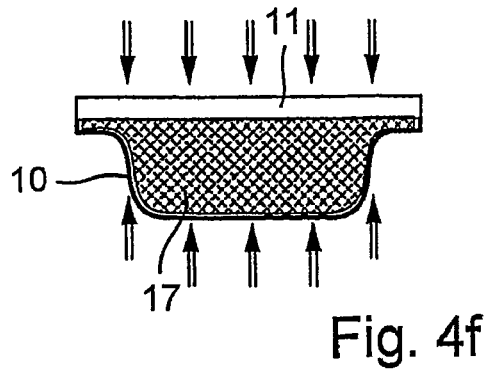

In the following processing step, which is shown in FIG. 4f, hot air flows through the mold formed by the bottom mold 10 and the top mold 11. This corresponds to the heating station S2 in FIG. 1. The hot air flows alternately through the holes 14 of the bottom mold 10 and also through holes on the top mold 11. The air temperature lies somewhat above the melting point of the enclosed bonding agent, which here consists of polypropylene fibers. After about two minutes, the process is ended. The preform has now solidified into a molded part 17.

The rotary table 1 (FIG. 1) is now turned by an additional 90°. The mold comprising the bottom mold 10 and the top mold 11 remains closed. Cold air now flows through it until the molded part 17 is cooled. This occurs in the cooling station S3 of FIG. 1.

In the last processing step, the rotary table 1 (FIG. 1) is turned by another 90° to the removal station S4. Here, the top mold 11 is removed from the bottom mold 10, and the completed molded part 17 can be removed.

SUMMARY OF THE REFERENCE SYMBOLS

1 Rotary table
2 Supply device
3 Fan
4 Fiber storage device
5 Lump opener
6 First line
7 Second line
8 Inflow channel
9 Temporary auxiliary top mold
10 Bottom mold
11 Top mold
12 Inflow opening
13 Holes (of 9)
14 Holes (of 10)
15 Preform
17 Molded part
S1 Blow in station
S2 Heating station
S3 Cooling station
S4 Removal station Although preferred embodiments of the invention have been described in detail herein those skilled in the art will recognize that various substitutions and modifications may be made without departing from the scope and spirit of the appended claims:

The invention claimed is:

1. A method for producing three-dimensional molded parts made of fiber material under the use of a mold comprising a bottom mold, whose inner side defines the contours of the bottom side of the molded part, and at least one top mold, whose inner side defines the contours of the top side of the molded part, with at least one of the bottom mold and the top mold featuring holes for the passage of air, said method comprising:

blowing-in of fibers by an air current into the intermediate space between the bottom mold and a temporary auxiliary top mold;

depositing fibers on the inner sides of the bottom mold and the temporary auxiliary top mold until the mold is filled, whereby a preform is formed from fiber material;

removing the temporary auxiliary top mold;

placing the top mold, whereby the preform is compacted; and connecting the fibers by a mixed-in bonding agent whereby the preform is solidified into a molded part.

2. The method according to claim 1, including the steps of:

blowing-in fibers by an air current into the intermediate space between the bottom mold and a first temporary top mold;

depositing fibers on the inner sides of the bottom mold and the first temporary top mold until the mold is filled, whereby an intermediate preform is formed from fiber material;

removing the first temporary top mold;

placing a second temporary top mold;

blowing-in additional fibers by an air current into the intermediate space between the bottom mold and the second temporary top mold;

depositing additional fibers on the top side of the intermediate preform and the inner side of the second temporary auxiliary top mold, whereby a preform made of fiber material is formed;

removing the second temporary top mold; and placing the top mold, whereby the preform is compacted.

3. The method according to claim 1, wherein:

the blowing-in is ended when a predetermined value of the air pressure in the mold is reached.

4. The method according to claim 1 wherein:

the preform is heated by one of heating the closed shape and causing hot air to flow through the mold, whereby a permanent connection of the fiber material is generated through reaction of the bonding agent and the preform is solidified into a molded part.

5. A device for producing a three-dimensional molded part made of blown fiber material comprising a mold, the mold comprising a bottom mold, the inner side of which defines the contours of the bottom side of the three-dimensional molded part, and at least one auxiliary top mold, the inner side of which is different from the contours of a top side of the molded part, wherein at least the bottom mold has holes for the passage of air, characterized in that the mold has at least one inflow opening for blowing in fiber material which is located at a point along where the bottom mold and the temporary auxiliary top mold adjoin each other.

6. The device according to claim 5, wherein:

a pressure sensor for measuring the air pressure is arranged in the interior of the mold.

7. The device according to claim 5, further comprising:

at least one top mold configured for cooperating with the bottom mold in place of the temporary auxiliary top mold, wherein an inner side of the top mold determines the contours of the top side of the molded part and wherein the top mold has holes for the passage of air.

8. The device according to claim 5, including:

a rotary table including:

a blow-in station, in which fiber material is blown into the mold;

a heating station for heating the mold;

a cooling station for cooling the molded part; and a removal station, in which the mold is opened and the molded part is removed.

9. A method for producing three-dimensional molded parts made of fiber material under the use of a mold comprising a bottom mold, whose inner side defines the contours of the bottom side of the molded part, and at least one top mold, whose inner side defines the contours of the top side of the molded part, with at least one of the bottom mold and the top mold featuring holes for the passage of air, said method comprising:

blowing-in fibers by an air current into an intermediate space between the bottom mold and a first temporary top mold;

depositing fibers on the inner sides of the bottom mold and the first temporary top mold until the mold is filled, whereby an intermediate preform is formed from fiber material;

removing the first temporary top mold;

placing a second temporary top mold;

blowing-in additional fibers by an air current into an intermediate space between the bottom mold and the second temporary top mold;

depositing additional fibers on the top side of the intermediate preform and the inner side of the second temporary auxiliary top mold, whereby a preform made of fiber material is formed;

removing the second temporary top mold; and placing the top mold, whereby the preform is compacted.

10. The method according to claim 9, wherein:

the blowing-in is ended when a predetermined value of air pressure in the mold is reached.

11. The method according to claim 9 wherein:

the preform is heated by one of heating the closed shape and causing hot air to flow through the mold, whereby a permanent connection of the fiber material is generated through reaction of the bonding agent and the preform is solidified into a molded part.

12. A method for producing three-dimensional molded parts made of fiber material under the use of a mold comprising a bottom mold, whose inner side defines the contours of the bottom side of the molded part, and at least one top mold, whose inner side defines the contours of the top side of the molded part, with at least one of the bottom mold and the top mold featuring holes for the passage of air, said method comprising:

blowing-in of fibers by an air current into an intermediate space between the bottom mold and a temporary top mold until a predetermined value of air pressure is reached in the mold;

depositing fibers on the inner sides of the bottom mold and the temporary auxiliary top mold until the mold is filled, whereby a preform is formed from fiber material;

removing the temporary top mold;

placing the top mold, whereby the preform is compacted;

connecting the fibers by a mixed-in bonding agent; and heating the preform by one of heating the closed shape and causing hot air to flow through the mold, whereby a permanent connection of the fiber material is generated through reaction of the bonding agent and the preform is solidified into a molded part.

13. A device for producing three-dimensional molded parts made of fiber material, the device having a mold comprising;

at least a first mold part and a second mold part, an inner side of the first mold part defining a first side of the three dimensional part to be molded, and an inner side of the second mold part determining the contours of a second side of the three dimensional part to be molded;

at least one of the first and second mold parts includes holes for the passage of air; and at least one auxiliary mold part adapted for connecting with the first mold part in place of at least the second mold part, and having an inner side that is different from at least the contour of the second side of the part to be molded;

wherein the mold includes at least one inflow opening for receiving blown fiber material.

14. The device of claim 13, wherein at least one of the at least one inflow openings is formed at the junction of the first mold part and the auxiliary mold part when the auxiliary mold part is connected to the first mold part.

* * * * *

UNITED STATES PATENT AND TRADEMARK OFFICE
CERTIFICATE OF CORRECTION

PATENT NO. : 7,622,062 B2
APPLICATION NO. : 10/558783
DATED : November 24, 2009
INVENTOR(S) : Egon Forster It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Twenty-sixth Day of October, 2010

David J. Kappos
*Director of the United States Patent and Trademark Office*